United States Patent [19]
Stokes, Jr.

[11] Patent Number: 5,673,507
[45] Date of Patent: Oct. 7, 1997

[54] APPARATUS FOR MOUNTING TROLLING DEVICES ON A WATERCRAFT

[76] Inventor: Donald R. Stokes, Jr., P.O. Box 862, Boynton Beach, Fla. 33425

[21] Appl. No.: 602,368

[22] Filed: Feb. 16, 1996

[51] Int. Cl.⁶ .................................................. A01K 97/10
[52] U.S. Cl. .................................. 43/21.2; 114/364
[58] Field of Search .................... 43/27.4, 21.2, 43/21; 114/343, 364

[56] References Cited

U.S. PATENT DOCUMENTS

| | | | |
|---|---|---|---|
| 3,550,302 | 12/1970 | Creviston et al. | 43/16 |
| 4,248,002 | 2/1981 | McNellis | 43/27.4 |
| 4,388,774 | 6/1983 | Thoemke | 43/27.4 |
| 4,425,729 | 1/1984 | Miyamae | 43/21.2 |
| 4,471,553 | 9/1984 | Copeland | 43/15 |
| 4,527,349 | 7/1985 | Emory, Jr. | 43/21.2 |
| 4,836,127 | 6/1989 | Wille | 43/21.2 |
| 4,901,469 | 2/1990 | Murray | 43/21.2 |
| 4,916,847 | 4/1990 | Rusgo | 43/21.2 |
| 5,435,093 | 7/1995 | Minorics et al. | 43/19.2 |
| 5,461,817 | 10/1995 | Flood | 43/19.2 |

*Primary Examiner*—Jeanne Elpel
*Attorney, Agent, or Firm*—Robert M. Downey, P.A.

[57] ABSTRACT

A support apparatus for use on a watercraft to hold several trolling devices such as outriggers, downriggers, and fishing rods includes oppositely disposed base members and a bridge structure including opposite vertical portions each attached to and extending upward from a corresponding one of the base members, and a horizontally extending portion integral with upper end zones of the vertical portions. The opposite base members removably mount to the watercraft to support the bridge structure above the watercraft's stern. Mounting structures are provided on the base members and bridge structure for holding the trolling devices in operative positions thereon.

10 Claims, 6 Drawing Sheets

APPARATUS FOR MOUNTING TROLLING DEVICES ON A WATERCRAFT

BACKGROUND OF THE INVENTION

1. Field of the Invention

The present invention relates to a trolling device support apparatus for fishing, and more particularly to an apparatus which removably mounts to and is supported across the stern of a watercraft for holding a plurality of various trolling devices in a convenient and operable arrangement for trolling.

2. Discussion of the Related Art

The sport of fishing has become increasingly popular in recent years, both for the professional angler and also the weekend fisherman. And, whether fishing in competition, for leisure, or to make a living, every fisherman has two primary concerns: Namely finding fish and catching fish. For this reason, fishing from a boat is most preferable, because the fisherman can go to the deeper, more populated areas using fish finding devices, following birds, and other well-known, or not so well-known techniques to locate schools of fish.

Trolling is the most common fishing method employed by serious anglers, because it enables the fisherman to cover a greater area while also attracting more predator fish. Trolling involves the use of various equipment including outriggers, downriggers, and conventional rods and reels, wherein a number of lines are let out behind a moving boat to drag either live bait or lures. The speed of the boat will vary depending on the type of bait or lures used, as well as the depth at which the bait or lures are being trolled. Ideally, six or more lines should be let out to troll lures, plugs, and/or bait in a spread array at different depths to simulate a school of bait fish. This method is highly effective in attracting predator fish, and greatly increases the odds of catching fish.

Many boats, however, have a limited capacity to hold rods and other trolling devices. In fact, most boats will only accommodate up to four rods, thereby limiting the effectiveness of trolling, specifically the ability to attract and catch fish. Due to the significant expense involved in a day of fishing, particularly the cost of running and maintaining the boat, it is highly desirous to maximize the fish catching potential of the boat and associated rigging.

Accordingly, there is an urgent need in the fishing industry for an apparatus or assembly which is structured to increase a boat's capacity for holding trolling devices in an operative, effective manner to maximize fish catching capabilities.

SUMMARY OF THE INVENTION

The present invention is directed to a support apparatus specifically structured for use on a watercraft to hold several trolling devices such as outriggers, downriggers, fishing rods, and the like in an operative, highly efficient manner.

The support apparatus includes oppositely disposed base members attached to a bridge structure. The bridge structure consists of opposite vertical portions each attached to a corresponding one of the base members and a horizontally extending portion integral with the upper end zones of the vertical portions. An extension member may be provided which interconnects along the horizontally extending portion to vary separation of the base members and attached vertical portions, thereby providing for adjustment of the overall length of the bridge structure. The opposite base members removably mount to the watercraft to support the bridge structure above the watercraft's stern. Means to adjust the height of the horizontally extending portion relative to the base members is further provided so that a sufficient clearance is maintained between the bridge structure and outboard engines or other objects on the stern of the watercraft. Means for mounting the trolling devices including plates and pole holders are provided on the base members and the bridge structure. The trolling device mounting means are specifically structured and positioned on the apparatus to support and maintain the various trolling devices in operable and highly efficient locations and orientations relative to one another, the apparatus and the boat.

With the foregoing in mind, it is a primary object of the present invention to provide a support apparatus which is adapted for removable mounting on a watercraft to support a plurality of trolling devices at the stern of the watercraft in an operable and highly efficient arrangement.

It is a further object of the present invention to provide a support apparatus, as set forth above, which is structured to hold and support at least six separate trolling devices in an operative, highly efficient arrangement.

It is still a further object of the present invention to provide a support apparatus for supporting a plurality of individual trolling devices thereon and which is manufactured entirely of non-corrosive materials.

It is yet a further object of the present invention to provide a support apparatus for supporting a plurality of trolling devices thereon and which is structured for removable mounting to a watercraft, wherein the apparatus can be removed and stowed on the watercraft when not in use.

It is yet a further object of the present invention to provide a support apparatus for supporting a plurality of trolling devices across the stern of a boat and which is specifically structured for easy, removable installation on inflatable or fixed transom boats or on conventional rigid hull boats.

It is still a further object of the present invention to provide an apparatus as set forth above which can be partially disassembled to facilitate stowing of the apparatus on a watercraft.

It is yet another object of the present invention to provide a support apparatus for supporting a plurality of trolling devices in an operative, efficient arrangement and which is structured for mounting to either a conventional rigid hull boat or an inflatable watercraft.

These and other objects and advantages will be more readily apparent in the description which follows.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Referring to the several views of the drawings, there is illustrated various embodiments of the support apparatus of the present invention, generally indicated as 10 throughout the drawings.

Figure 1:
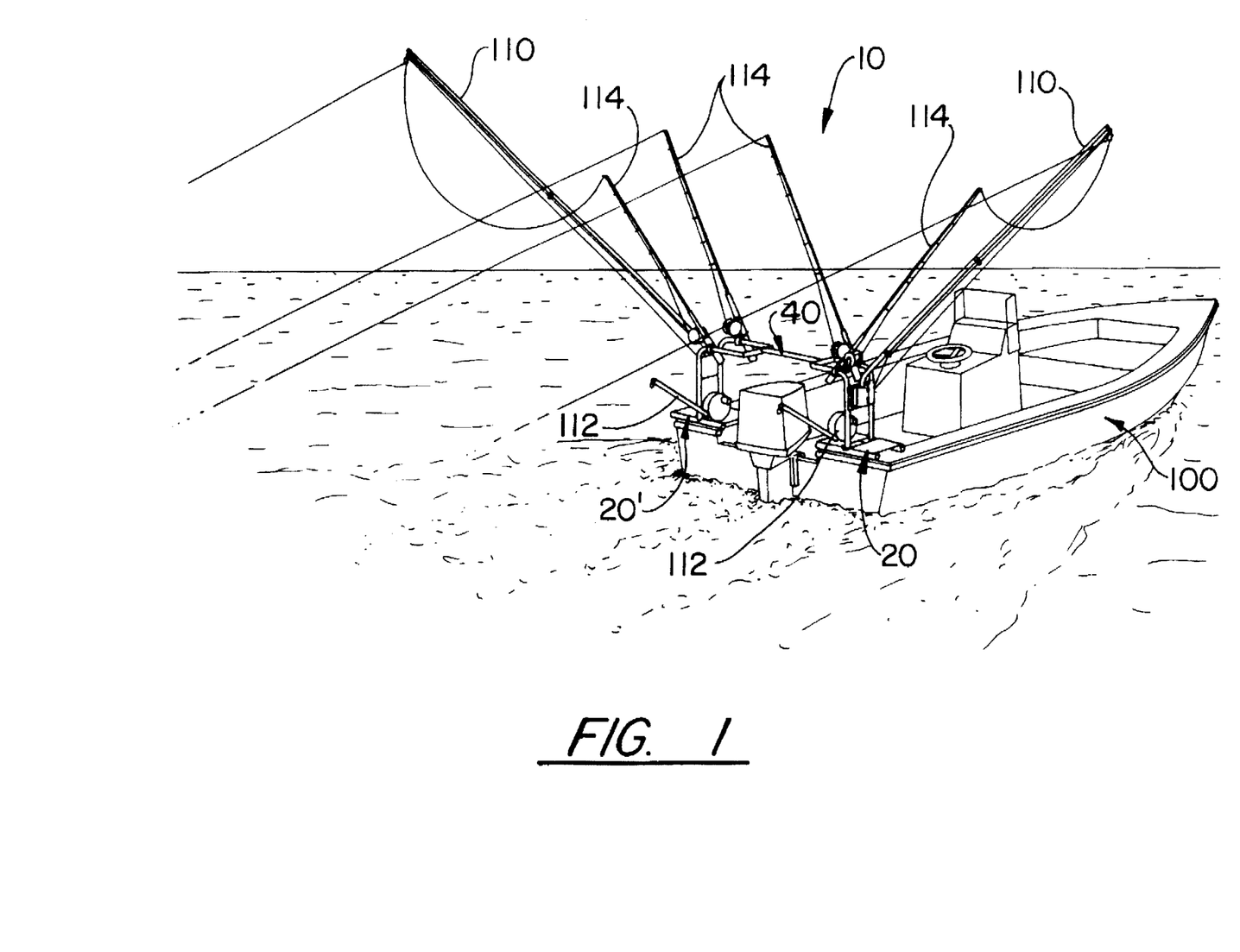
FIG. 1 is a perspective view showing the support apparatus of the present invention mounted to a rigid hull boat with a plurality of various trolling devices operably installed thereon.
Figure 2:
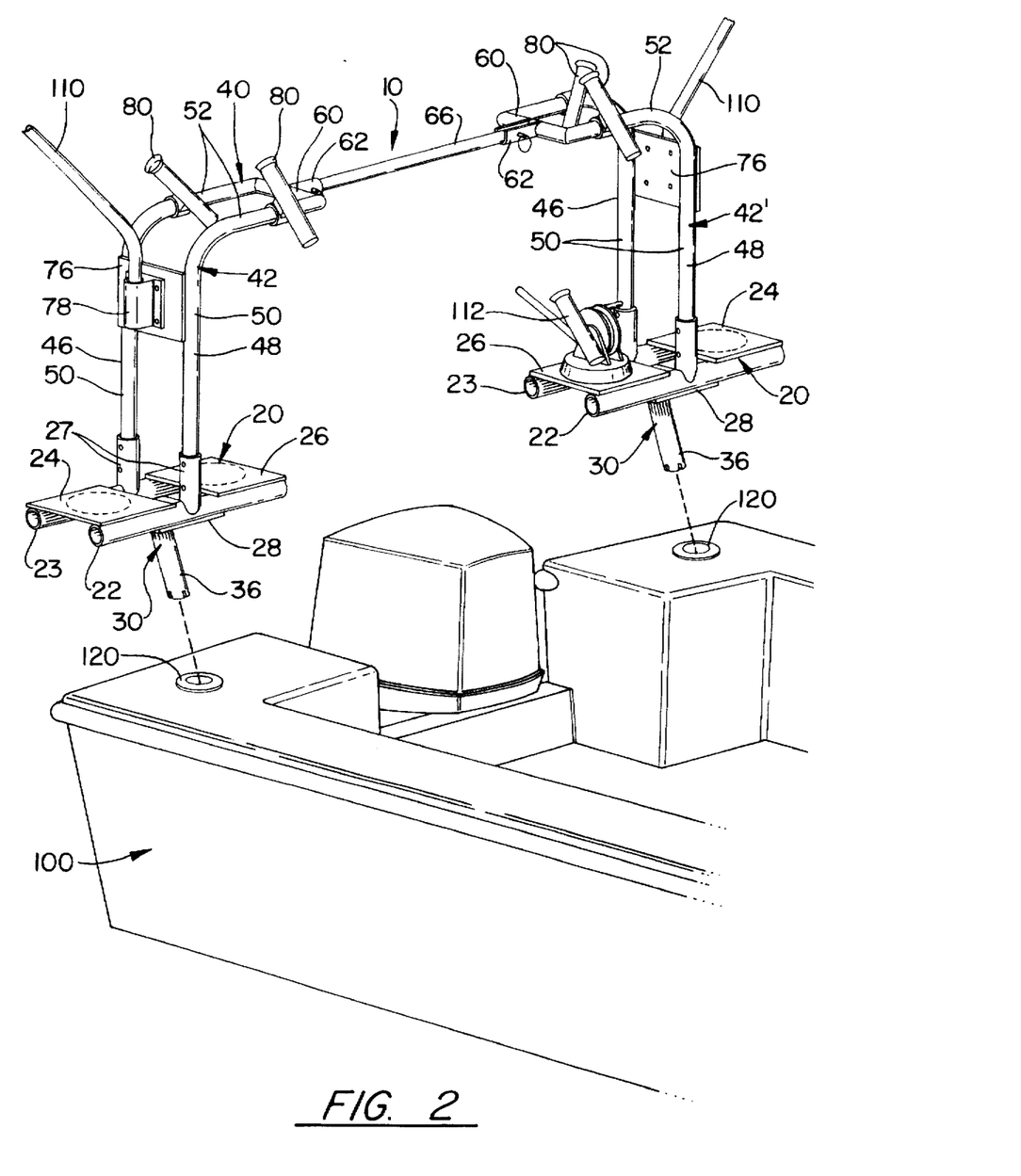
FIG. 2 is an isolated perspective view of a first preferred embodiment of the present invention, illustrating mounting of the support apparatus within rod holders on a rigid hull boat using universal gimbles attached to the base members of the apparatus.
Figure 3:
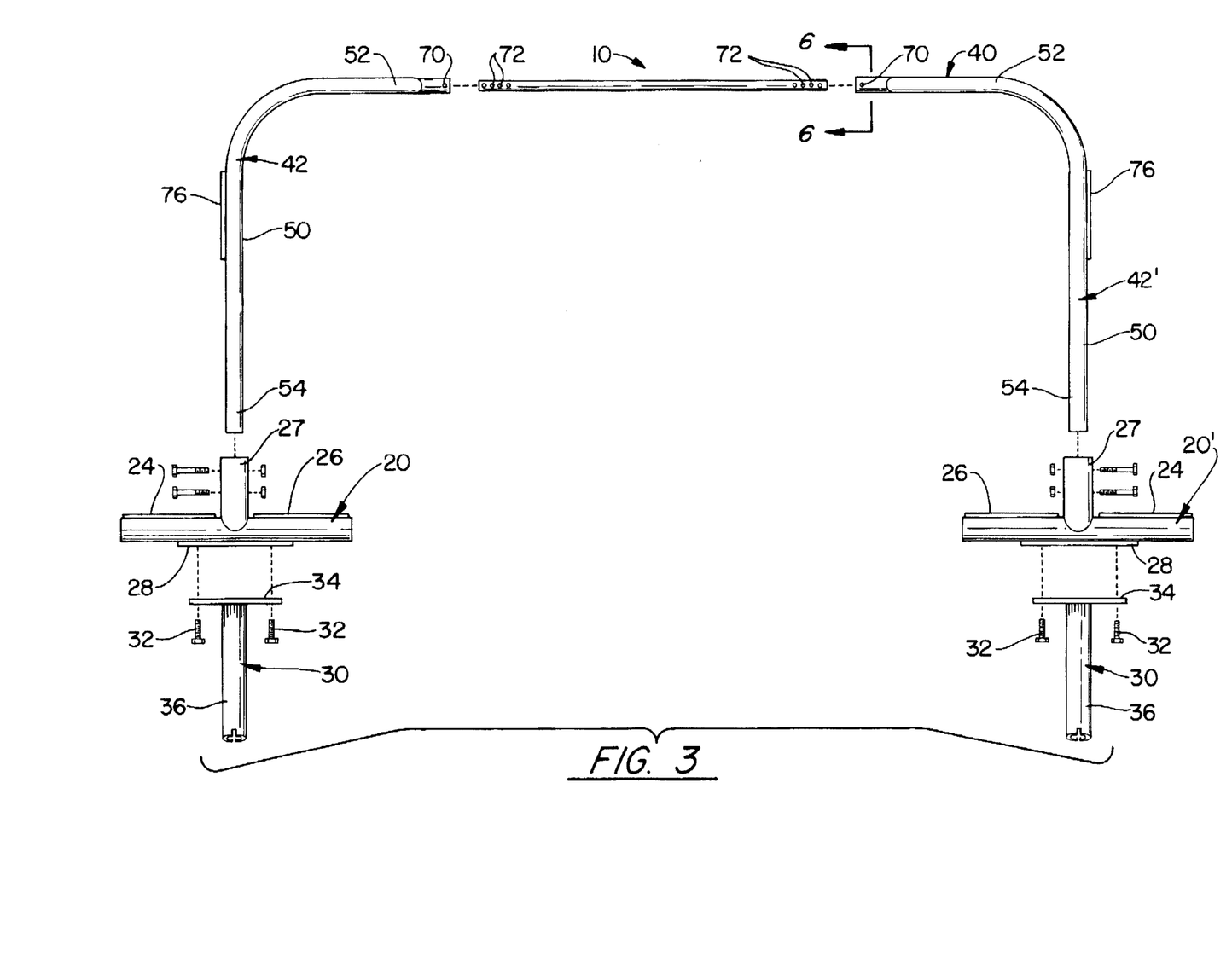
FIG. 3 is an exploded front elevational view of the embodiment of FIG. 2, illustrating assembly of the component parts thereof.

With initial reference to FIGS. 1–3, a first preferred embodiment of the support apparatus 10 is shown. This particular embodiment is adapted for removable mounting within rod holders on a conventional, rigid hull boat 100. As seen in FIG. 1, the support apparatus is specifically structured to hold various trolling devices such as, but not limited to, outriggers 110, downriggers 112, and fishing rods 114. The various trolling devices supported thereon are held and supported in accordance with what is considered to be a highly efficient and operable arrangement so that even a sole fisherman/boat operator can use six or more trolling devices simultaneously to maximize fish catching capabilities.

As seen in FIGS. 2 and 3, the support apparatus 10 of the first preferred embodiment includes opposite base members 20, 20' positioned and disposed in spaced, opposite relation to one another. In this particular embodiment, the base members each include a pair of parallel, horizontal bars 22, 23 secured to a pair of opposing end plates 24, 26 which are welded to the parallel bars 22, 23 to define an integral unit. A pair of short, hollow vertical extensions 27 are welded to and extend upwardly from each of the horizontal bars 22, 23 of each base member 20, 20'.

A bottom plate 28 is centered and welded to a bottom of the parallel, horizontal bars 22, 23 of each base member 20, 20' to facilitate mounting of a universal gimbal 30 thereto using conventional fasteners 32, such as aluminum or stainless steel screws or bolts. The universal gimbal 30 includes a mounting plate 34 and an angled mount extension arm 36 specifically sized, configured and oriented for sliding receipt within the corresponding rod holder 120 on the port or starboard side of the boat's stern.

Figures 4, 5, 6, 7A, 7B:
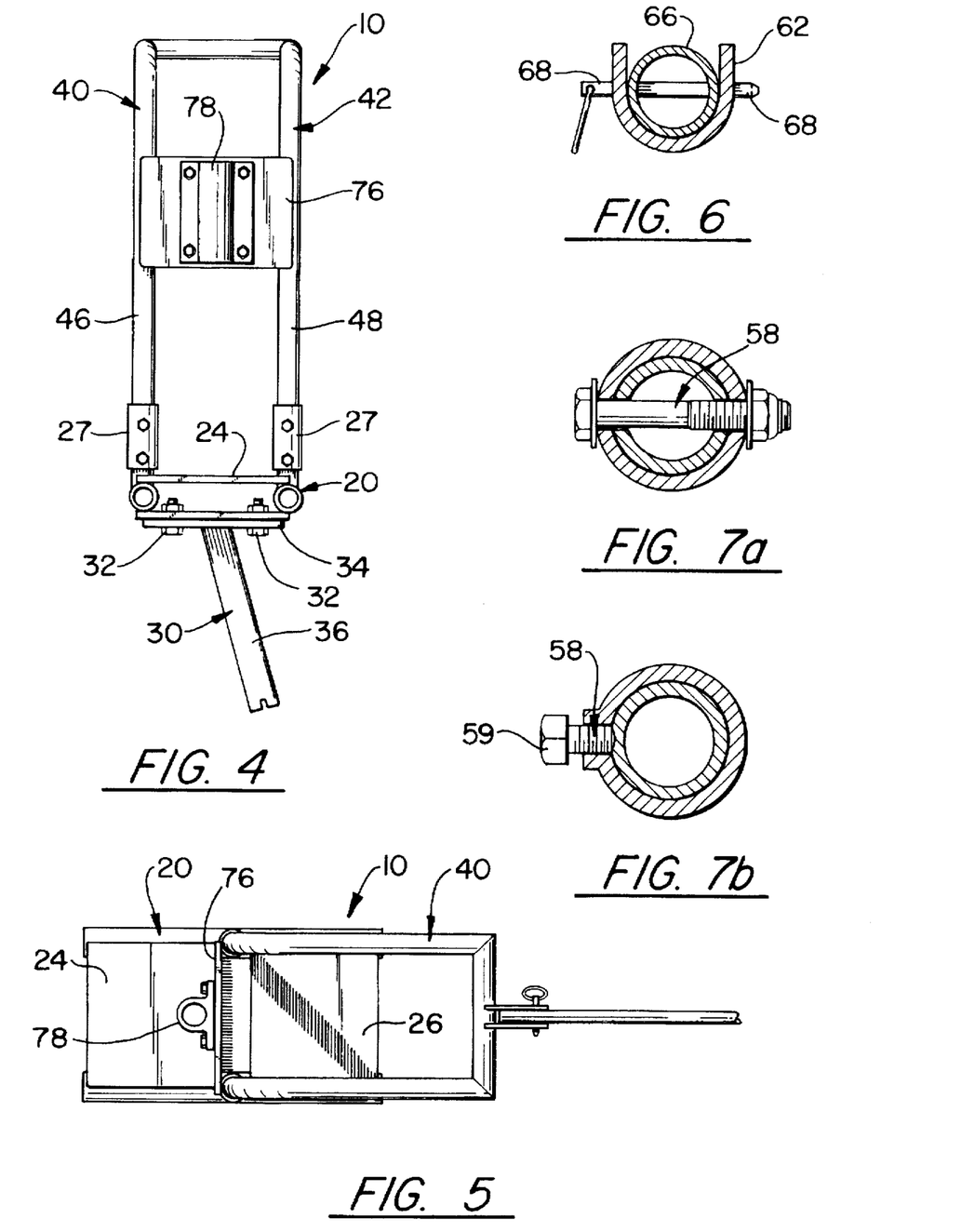
FIG. 4 is a side elevational view of the embodiment of FIG. 2.
FIG. 5 is an isolated top plan view of one side of the support apparatus.
FIG. 6 is a sectional view taken along the line 6—6 of FIG. 3.
FIG. 7A is a sectional view taken along the line 7A—7A of FIG. 2.
FIG. 7B is a sectional view of an alternative embodiment of the attachment assembly of FIG. 7A.

The support apparatus 10 further includes a bridge structure 40 including left and right sections 42, 42' each adapted for fixed, adjustable attachment to a respective, corresponding one of the base members 20, 20'. The left and right sections 42, 42' are primarily defined by parallel pipes 46, 48 which are bent to define vertical portions 50 and horizontal portions 52. The vertical portions of each of the pipes of the respective left and right bridge sections each include a lower end zone 54 adapted for telescopic, adjustable receipt within a corresponding one of the hollow vertical extensions 27 on the base members 20, 20'. Alternatively, a tubular extension adaptor can be used to telescopically receive the lower end zone 54 through one end and the vertical extension 27 through an opposite end. The extension adaptor is simply a straight extension of hollow pipe which has a larger inner diameter than the outer diameters of the lower end zone 54 and vertical extension 27. Means are provided on the opposite ends of the extension adaptor for adjustable, locking engagement with the lower end zone 54 and the vertical extension 27. The lower end zones 54, once fitted and selectively positioned within the vertical hollow extensions 27 or extension adaptor, are secured therein using any of a desired number of attachment means 58 such as those shown in FIGS. 7A and 7B. In FIG. 7A, a through bolt is shown which extends through correspondingly aligned apertures formed in the lower end zone of the vertical extensions and the hollow vertical sockets on the base members. Alternatively, a set screw 59 can be used which threads through a threaded aperture formed in the sides of the hollow vertical extensions 27 for engagement against the lower end zones of the respective lower end zones 54 of the vertical extensions of the bridge sections. Selective positioning of the lower end zones within the hollow extensions 27 or extension adaptor enables for varying the overall height of the bridge structure 40.

The horizontal extensions of each of the left and right bridge sections are fitted to a generally Y-shaped fitting 60 having a central, horizontally extending channel 62 adapted for adjustable, fitted receipt of an extension cross bar 66 to effectively interconnect the left and right bridge sections 42, 42'. Attachment of the extension cross bar 66 within the respective channels 62 of the Y-shaped member 60 is shown in FIG. 6, wherein a pin 68 is inserted through aligned apertures 70 and 72 on the channel and the cross bar respectively. By selectively positioning the cross bar within each of the opposite channels on the sections 42, 42', the overall length of the apparatus 10 can be selectively adjusted, thereby accommodating for various distances of separation between the rod holders 120 on different boat models.

Figure 8:
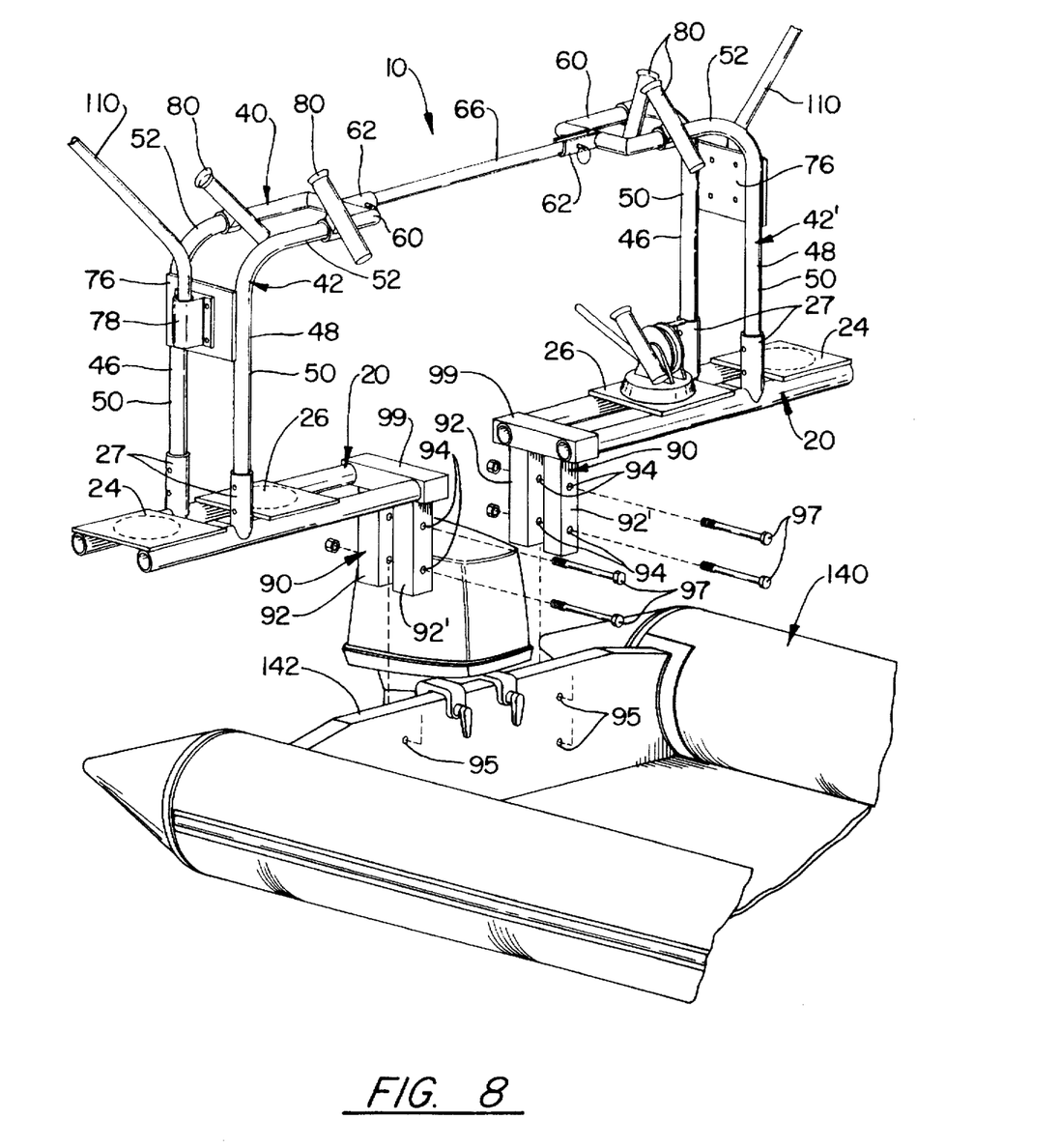
FIG. 8 is a partially exploded perspective view illustrating mounting of a second preferred embodiment of the apparatus to the rigid transom of an inflatable watercraft.

Side plates 76 are provided on each of the left and right bridge sections 42, 42' and are welded to the parallel, vertically extending bars. A fitting such as 78 can be attached to these plates 76 to hold and support outriggers, as seen in FIGS. 1, 2, 4 and 8. A plurality of rod holders 80 are selectively attached and positioned on the apparatus 10 such as at various points along the horizontally extending portion of the bridge structure 40, as best seen in FIGS. 2 and 8. The rod holders are specifically arranged and positioned to hold fishing rods 114 at preferred angled orientations so that lines extending from each of the rods do not tangle with one another or with lines extending from other devices supported on the apparatus 10. The top plates 24, 26 on each of the base members 20, 20', as well as the side plates and rod holders all define means for mounting trolling devices to the apparatus 10. The plates 24, 26 on the base members 20, 20' are ideally suited for mounting downriggers thereon, as seen in FIGS. 1, 2, and 8. It can therefore be appreciated that the apparatus 10 is structured for and particularly suited to accommodate a large number of trolling devices on a relatively small watercraft, wherein the trolling devices are maintained and supported in an operative, highly efficient arrangement.

Figure 9:
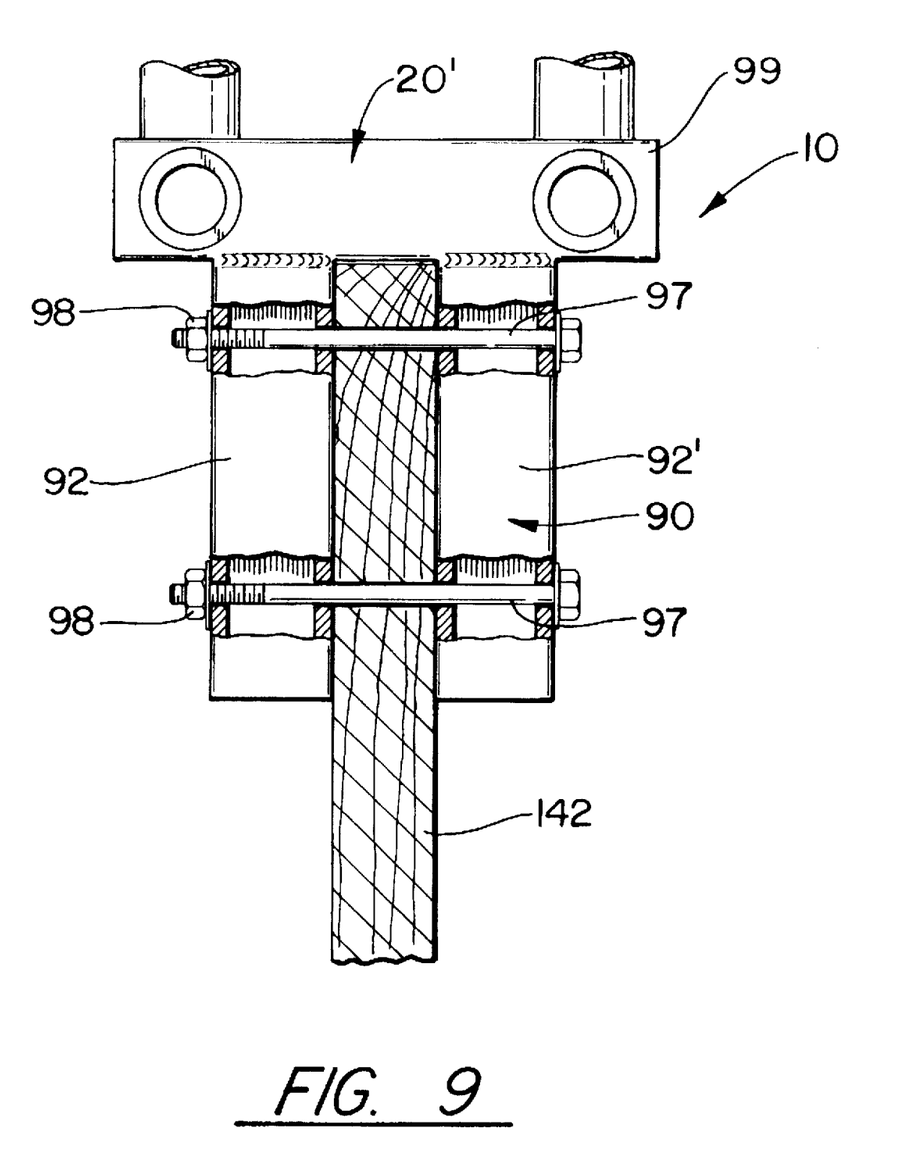
FIG. 9 is an isolated view, in partial section, illustrating the mounting assembly of the embodiment of FIG. 8 mounted to the fixed rigid transom of the inflatable watercraft.

Referring to FIGS. 8 and 9, a second preferred embodiment of the present invention is shown wherein the support apparatus 10 includes a mounting assembly 90 particularly suited for mounting the base members 20, 20' to the transom 142 of an inflatable watercraft 140 or other watercraft having a fixed, rigid transom of the type shown in FIG. 8. Specifically, the mounting assembly 90 includes two spaced square tubes 92, 92' on each of the respective base members 20, 20'. The square tubes 92, 92' on each of the base members are specifically spaced from one another so that they slide down on opposite sides of the transom 142. Apertures 94 are provided through both sides of each of the square tubes 92, 92' for alignment with drilled holes 95 through the transom. Once the apertures are aligned with the respective holes, through bolts 97 are fitted through the entire thickness of the square tubes and transom and a nut 98 or other conventional fastening means is used to maintain the square tubes 92, 92' fixed on opposite sides of the transom 142. Horizontal square tube segments 99 may be provided to facilitate attachment of the square tube extensions 92, 92' to the respective base members 20, 20'. The remainder of the apparatus 10 in the embodiment of FIG. 8 is generally identical to that previously described in connection with the first embodiment of FIGS. 1–4.

While the instant invention has been shown and described in what is considered to be preferred and practical embodiments thereof, it is recognized that departures may be made within the spirit and scope of the present invention which, therefore, should not be limited except within the spirit and scope of the invention as set forth in the following claims and within the doctrine of equivalents.

Now that the invention has been described,

What is claimed is:

1. For use on a watercraft having a stern, a support apparatus for holding a plurality of trolling devices including, but not limited to, outriggers, fishing rods, and downriggers, said support apparatus comprising:

first and second base members, each having a top side and a bottom side, a first bridge section having a lower end attachable to said top side of said first base member, and a second bridge section having a lower end attachable to said top side of said second base member, said first and second bridge sections each including a vertical portion extending upwardly from said respective lower ends, and a horizontal portion extending from said vertical portion and terminating at an upper end zone, adjustable extension means for selectively varying a distance between said first and second base members and being releasably attachable to said upper end zones of said first and second bridge sections respectively, extending horizontally therebetween, wherein said first and second bridge sections and said adjustable extension means define a bridge structure, securing means for removably securing said base members to the watercraft so that the bridge structure is supported above the stern of the watercraft, and mounting means on said support apparatus for removably mounting a plurality of trolling devices in operative positions thereon, said mounting means including holding means attached to the vertically extending portion between said base member and said horizontal portion of at least on bridge section for holding trolling device.

2. An apparatus as recited in claim 1 wherein said mounting means includes a plurality of mounting plates on each of said base members to facilitate mounting of trolling devices thereon.

3. An apparatus as recited in claim 2 wherein said mounting means further includes plate members fixedly attached to said vertically extending portions and including means thereon for holding outriggers.

4. An apparatus as recited in claim 2 wherein said holding means further includes a plurality of fishing rod holders structured to removably receive and support a butt end of a fishing rod, said fishing rod holders being attached to said apparatus at selective locations thereon and being positioned so as to maintain fishing rods held thereon in preferred, operable orientations.

5. An apparatus as recited in claim 1 wherein said securing means includes a pair of universal gimbals each fixedly attached to a bottom of a respective, corresponding one of said base members, said universal gimbals each including an extending arm portion adapted for sliding, removable receipt within rod holders on the watercraft.

6. An apparatus as recited in claim 1 wherein said securing means includes a pair of square tube extensions on each of said base members, said square tube extensions disposed in spaced, parallel relation and being structured and configured for fitted receipt on opposite sides of a rigid transom of the watercraft.

7. An apparatus as recited in claim 6 wherein said securing means further includes fastening elements adapted for fitted receipt through said square tube extensions and said transom to fixedly attach said base members to said transom.

8. An apparatus as recited in claim 1 further including means for adjustable extension of said vertical portions of said first and second bridge sections to selectively vary the height of said bridge structure relative to said base members and the stern of the watercraft.

9. For use on a watercraft having a stern, a support apparatus for holding a plurality of trolling devices including, but not limited to, outriggers, fishing rods, and downriggers, said support apparatus comprising:

first and second base members, each having a top side and a bottom side, a first bridge section having a lower end attachable to said top side of said first base member, and a second bridge section having a lower end attachable to said top side of said second base member, said first and second bridge sections each including a vertical portion extending upwardly from said respective lower ends, and a horizontal portion extending from said vertical portion and terminating at an upper end zone, adjustable extension means for selectively varying a distance between said first and second base members and being releasably attachable to said upper end zones of said first and second bridge sections respectively, extending horizontally therebetween, wherein said first and second bridge sections and said adjustable extension means define a bridge structure, securing means for removably securing said base members to the watercraft so that the bridge structure is supported above the stern of the watercraft, said securing means including a pair of universal gimbals each fixedly attached to a bottom of a respective, corresponding one of said base members, said universal gimbals each including an extending arm portion adapted for sliding, removable receipt with rod holders of the watercraft, and mounting means on said support apparatus for removably mounting a plurality of trolling devices in operative positions thereon, said mounting means including a plurality of mounting plates on each of said base members to facilitate mounting of trolling devices thereon and plate members fixedly attached to said vertically extending portions having means thereon for holding outriggers, and said mounting means further including a plurality of fishing rod holders structured to removably receive and support a butt end of a fishing rod, said fishing rod holders being attached to said apparatus at selective locations thereon and being structured and disposed to maintain fishing rods held thereon in preferred, operable orientations.

10. For use on a watercraft having a stern, a support apparatus for holding a plurality of trolling devices including, but not limited to, outriggers, fishing rods, and downriggers, said support apparatus comprising:

first and second base members, each having a top side and a bottom side, a first bridge section having a lower end attachable to said top side of said first base member, and a second bridge section having a lower end attachable to said top side of said second base member, said first and second bridge sections each including a vertical portion extending upwardly from said respective lower ends, and a horizontal portion extending from said vertical portion and terminating at an upper end zone, adjustable extension means for selectively varying a distance between said first and second base members and being releasably attachable to said upper end zones of said first and second bridge sections respectively, extending horizontally therebetween, wherein said first and second bridge sections and said adjustable extension means define a bridge structure, securing means for removably securing said base members to the watercraft so that the bridge structure is supported above the stern of the watercraft, said securing means including a pair of square tube extensions on each of said base members, said square tube extensions being disposed in spaced, parallel relation and being structured and configured for fitted receipt on opposite sides of a rigid transom of the watercraft, and fastening elements adapted for fitted receipt through said square tube extensions and said transom to fixedly attach said base members to said transom, and mounting means on said support apparatus for removably mounting a plurality of trolling devices in operative positions thereon, said mounting means including a plurality of mounting plates on each of said base members to facilitate mounting of trolling devices thereon and plate members fixedly attached to said vertically extending portions and including means thereon for holding outriggers, and said mounting means further including a plurality of fishing rod holders structured to removably receive and support a butt end of a fishing rod, said fishing rod holders being attached to said apparatus at selective locations thereon and being structured and disposed to maintain fishing rods held thereon in preferred, operable orientations.

* * * * *